Patented July 31, 1934

1,968,737

UNITED STATES PATENT OFFICE 1,968,737

PROCESS FOR THE SEPARATION OF MAGNESIUM CHLORIDE FROM CALCIUM CHLORIDE

Taylor A. Borradaile, Charleston, W. Va., assignor to Alkaline Earths Company, Charleston, W. Va., a copartnership composed of Taylor A. Borradaile, Frederick J. Kaufman, and Benj. Preiser No Drawing. Application March 16, 1933, Serial No. 661,118

10 Claims. (Cl. 23—90)

My invention relates to the treatment of aqueous solutions containing a mixture of magnesium chloride and calcium chloride, and more particularly it relates to a novel and economic method for the recovery of relatively pure magnesium chloride from natural or artificially prepared solutions containing also calcium chloride. The present application is a continuation in part of my co-pending application, Serial No. 628,581, filed August 12, 1932.

One object of my invention is to provide a crystallization process by which it is possible to separate the calcium and magnesium chlorides from each other by a treatment of a solution containing both salts and to recover each of them in suitable commercial forms, practically uncontaminated by the other salt.

Still another object of my invention is to provide a process by which relatively pure magnesium chloride may be obtained in practically theoretical amounts from a solution containing both magnesium and calcium chlorides, which process is expedient to carry out and involves the use of a minimum amount of time and equipment.

Other objects will be apparent from a consideration of the specification and claims.

Brine derived from various salt wells such as are found in the Kanawha Valley of West Virginia, Ohio and Michigan are first treated to recover the common salt by evaporation and crystallization steps and then the bromine is removed therefrom in any well known manner. The residue of this process, known to the trade as bittern water, is a fairly concentrated solution containing principally calcium and magnesium chlorides with traces of sodium chloride. Heretofore this bittern water has been further concentrated until a solid mixture is formed which has been sold on the market as fused mixed chlorides. Various attempts have been made to separate the magnesium chloride from the calcium chloride by means of fractional crystallization, but these processes require a large amount of equipment and a great expenditure of time to obtain the separation. Furthermore, the separation of the two salts is not complete since a portion of the magnesium chloride usually remains with the calcium chloride and is not separated therefrom.

Mixtures of calcium and magnesium chlorides from any source can be employed in the process of the present invention, for example, in addition to the bittern water above described, other by-products containing a mixture of calcium and magnesium chlorides or artificially prepared solutions containing these salts may be used. As typical of the by-products containing both chlorides in addition to the bittern water resulting from salt purification, reference may be made to the by-product bittern water obtained from the Solvay process when dolomitic limestone is used therein. As an example of an artificially prepared solution containing magnesium chloride and calcium chloride, the solution obtained by treating dolomitic limestone or magnesium limes, or products obtained therefrom, with hydrochloric acid may be mentioned. The solutions may contain small amounts of impurities, such as potassium and sodium chlorides, but these do not interfere with the successful carrying out of the process contemplated. If the solution contains compounds of iron, aluminum, silicon or the like, it may be purified, if desired, by rendering the solution slightly alkaline and thereafter removing the insoluble material from the solution by filtration before employing it in the present process.

In the process of the present invention the magnesium chloride is separated from the calcium chloride by the formation of a double salt of magnesium chloride and ammonium chloride in the solution. This double salt when crystallized has the formula: $MgCl_2.NH_4Cl.6H_2O$. Ammonium chloride may be added to the solution being treated either in solution or in solid form, and preferably it is used in the proportion of 1 molecular weight of ammonium chloride to 1 molecular weight of magnesium chloride in the solution. While smaller amounts of ammonium chloride may be added, if desired, and the double salt formed will be in proportion to the amount of ammonium chloride added, it is preferable to add it in molecular proportions in order to obtain the best recovery. An excess of ammonium chloride is not deleterious to the process; but since it represents a loss of material, its use is not recommended. Since the crystallization is preferably carried on at a temperature at or greater than 30° C., as hereinafter described, the temperature of the solution after the addition of the ammonium chloride and before crystallization starts should be higher than that chosen for crystallization. Furthermore, if solid ammonium chloride is added, it is necessary that this compound be dissolved and distributed through the solution before the crystals of magnesium ammonium chloride separate. After the ammonium chloride is distributed in the solution, the temperature may be lowered and crystallization allowed to proceed.

The presence of the calcium chloride in the solution containing the magnesium chloride and ammonium chloride contrary to the expected effect exerts a remarkable and hitherto unknown action in the solubility of the magnesium ammonium chloride. I have found that this double salt is much less soluble in a given volume containing calcium chloride than it is in the same volume of water. The presence of the calcium chloride renders the magnesium ammonium chloride less soluble in almost direct proportion to the amount of calcium chloride figured as hexahydrate that is in the solution.

The amount of magnesium ammonium chloride hexahydrate crystals obtained is dependent upon the concentration of the solution, its temperature, and the amount of calcium chloride present. In a solution containing 2.7 parts by weight of calcium chloride and 1 part by weight of magnesium chloride in the presence of ammonium chloride in correct amounts, crystals of magnesium ammonium chloride hexahydrate will be obtained at 30 degrees C. if the solution is of a concentration higher than 27° Baumé, or of a boiling point higher than 116° C. At 100 degrees C., however, crystals will not form in this solution unless the concentration is in the neighborhood of 48° to 50° Baumé in which case the solution boils at approximately 132° C. In this latter case, obviously, the amount of crystals obtained is increased as the temperature is decreased. The same relative relationship exists in solutions containing other ratios of the two chlorides. Hereinafter in the specification and claims where the term "concentrated solution" is employed to refer to the solution containing the calcium and magnesium chloride, it is to be understood that all solutions are included whose concentrations are such that magnesium ammonium chloride hexahydrate will crystallize therein. The temperature may be lowered until a temperature is reached where the calcium chloride hexahydrate separates with the magnesium ammonium chloride hexahydrate. In most cases it will not be desirable to carry the crystallization temperature below 30 degrees C., for in concentrated solutions, the calcium chloride hexahydrate tends to crystallize at 29 degrees C. If care is taken not to disturb the solution, it may be carried to 25 degrees C., and the magnesium ammonium chloride hexahydrate obtained without contamination with the calcium chloride hexahydrate. While the crystallization point of the calcium chloride hexahydrate is 29 degrees C., the temperature may be carried below the crystallization point before crystallization occurs in this case as happens with most salts if the solution is not agitated or seeded.

In the preferred process where the most economic recovery is desired, the concentration of the solution to be crystallized, at least in the final crystallization step, is so adjusted that practically all of the magnesium ammonium chloride hexahydrate will crystallize at 30 degrees C. I have found that if the water is evaporated until there is just sufficient remaining to supply both the calcium chloride and the magnesium ammonium chloride with six molecules of water, a complete removal for all practical purposes of the magnesium ammonium chloride hexahydrate will be obtained at this temperature. In the process advantage is taken of the unexpected phenomenon that the magnesium ammonium chloride hexahydrate is insoluble at 30 degrees C. in calcium chloride dissolved in its water of crystallization, which temperature is above the temperature of crystallization of the calcium chloride hexahydrate. The concentration of the solution under these conditions is approximately 50° Baumé.

If the ratio of magnesium chloride to calcium chloride is greater than 1 to 3, then there will be sufficient magnesium ammonium chloride hexahydrate present in crystalline form at 30 degrees C. to solidify the mass partially, and to render it difficult to filter. For best results the proportion of crystals at the temperature of crystallization should not exceed 35% by weight of the total solution. For this reason, if the ratio of magnesium chloride to calcium chloride is greater than 1 to 3, I recommend that at least one preliminary crystallization step shall be carried out to remove a portion of the double salt prior to the final crystallization as above described.

This preliminary crystallization may be brought about in the original solution if it is sufficiently concentrated or by evaporating only a portion of the water in the first instance, leaving sufficient water in the solution to act as a solute to prevent the formation of an unfilterable mass. The solution may thereafter be cooled, for instance, to 30 degrees C. to remove the first group of crystals. Thereafter evaporation may be further continued until there remains only sufficient water to furnish the six molecules of water of crystallization to the two salts in the mother liquor and the solution again cooled to 30 degrees C., whereupon practically complete recovery of the magnesium ammonium chloride hexahydrate is obtained.

Another method which may be employed, in the event that the magnesium chloride content in solution is large, is to evaporate the solution to the final concentration where it contains only sufficient water to supply the magnesium ammonium chloride and calcium chloride in the solution with six molecules of water, and then to remove the first crop of crystals at a temperature considerably above 30° C., for example at 60° C. Thereafter, the mother liquor remaining after the separation of the first crop of crystals may be cooled to 30° C. to remove the magnesium chloride hexahydrate remaining in the solution. This method is somewhat difficult to carry out and is not preferred since great care must be taken to prevent the solution from cooling during the filtration of the first crop of crystals. Obviously, if the solution becomes cooled the mass on the filter solidifies and prevents satisfactory filtration.

In any case, where it is desired to remove all of the magnesium chloride as magnesium ammonium chloride hexahydrate, the solution containing the magnesium and calcium chloride is analyzed for calcium chloride and magnesium chloride and these compounds are calculated as calcium chloride hexahydrate and magnesium ammonium chloride hexahydrate respectively. The necessary amount of ammonium chloride to react with the magnesium chloride is then added. The total weights of calcium chloride hexahydrate and magnesium ammonium chloride hexahydrate are subtracted from the total weight of the solution including the weight of the added ammonium chloride and the figure obtained corresponds to the amount of water which it is necessary to evaporate in order to leave only six molecules of water for each molecule of calcium chloride and magnesium ammonium chloride. In the event that the amount of magnesium chloride in the solution is less than 1 part to 3 parts of calcium chloride, the amount of water to be removed ascertained as the result of the analyses and calculations is evaporated and the solution cooled to 30° C. to obtain the magnesium ammonium chloride hexahydrate uncontaminated by calcium chloride hexahydrate as hereinbefore described. In the event that the ratio of the magnesium chloride to calcium chloride in the solution is greater than 1 to 3, one of the procedures outlined previously may be followed in order to avoid the formation of an unfilterable mass. In either case, the final separation of the crystals from the mother liquor will be carried out at 30° C. in the presence of only sufficient water to form the hexahydrates of both calcium chloride and magnesium ammonium chloride in which case a recovery of more than 99% of the magnesium chloride originally in the solution will be obtained.

In a typical case, 1,000 grams of a solution containing 30% calcium chloride and 10% magnesium chloride is treated with 53.6 grams of ammonium chloride which is equivalent to one molecular weight of ammonium chloride to one molecular weight of the magnesium chloride in the solution. A calculation shows that the 300 grams of calcium chloride are equivalent to 592 grams of calcium chloride hexahydrate, and that 100 grams of magnesium chloride will be converted into 256.5 grams of magnesium ammonium chloride hexahydrate. The total weight of the solution including the weight of the ammonium chloride is 1053.5 grams, showing that there are 205 grams of water present in the solution as a solute, in excess of the amount necessary to form the hexahydrates. This water of solution will exert a solvent action on a portion of the magnesium ammonium chloride, and will hold approximately 53% or 108.65 grams of the double salt in solution at 30° C. Cooling the solution, therefore, without evaporation will result in a recovery of only 148 grams of the double salt. This crop of crystals may be removed by cooling the solution to 30° C. or the solution may be concentrated to evaporate the 205 grams of water of solution before any crystals are removed, since in this particular case, the ratio of magnesium chloride to calcium chloride in the original solution is not greater than 1 to 3, and the mass at 30° C. will be filterable. If this latter procedure is adopted, the solution weighing 1053.5 grams is evaporated to remove the 205 grams of water of solution and is then cooled to approximately 30° C., whereupon practically all of the magnesium ammonium chloride hexahydrate is crystallized out of the solution in which the calcium chloride remains dissolved in its own water of crystallization. As before pointed out, the magnesium ammonium chloride is practically insoluble in the amount of water necessary to form the calcium chloride hexahydrate. The solution after the removal of the magnesium ammonium chloride by filtration contains 49% to 50% calcium chloride equivalent to 98% to 99% of calcium chloride hexahydrate with less than 1% of magnesium ammonium chloride hexahydrate associated therewith. When this solution is cooled to a temperature below 29° C., crystals of solid calcium chloride hexahydrate will be obtained. By concentration of the solution, a very high quality of relatively pure calcium chloride is obtained which product is comparable to the 80% fused calcium chloride that is manufactured by the well known methods now in use, and upon further concentration a high quality of anhydrous calcium chloride is obtained.

The magnesium ammonium chloride hexahydrate obtained by the process of the present invention may be purified, if desired, by either washing or crystallization. The double salt can either be sold as such, or by further treatment converted into other products. It may, for instance, be dehydrated and subsequently heated to remove the ammonium chloride by sublimation, leaving, as a residue, a fine powder of practically pure anhydrous magnesium chloride. This product has a wide use as a dehydrating agent, and is also the essential raw material in the electrolytic processes employed in the manufacture of magnesium metal.

Obviously, since the present invention is applicable for use in conjunction with any solution containing magnesium and calcium chlorides, the steps and factors employed in carrying out the process may vary widely and will be adjusted to suit the conditions of the particular solution, without departing from the essence of the invention.

I claim:

1. The process of treating a concentrated solution containing magnesium chloride and calcium chloride to separate the two salts from each other which comprises adding ammonium chloride to said solution, allowing crystals of magnesium ammonium chloride hexahydrate to form therein, and thereafter separating the crystals from the solution.

2. The process of treating a concentrated solution containing magnesium chloride and calcium chloride to separate the two salts from each other which comprises adding ammonium chloride to said solution in the approximate proportion of one molecular weight of ammonium chloride to one molecular weight of magnesium chloride in the solution, allowing crystals of magnesium ammonium chloride hexahydrate to form, and thereafter separating the crystals from the solution.

3. The process of treating a concentrated solution containing magnesium chloride and calcium chloride to separate the two salts from each other which comprises adding ammonium chloride to said solution, cooling said solution to approximately 30 degrees C. to form crystals of magnesium ammonium chloride hexahydrate therein, and thereafter separating the crystals from the solution.

4. The process of treating a concentrated solution containing magnesium chloride and calcium chloride to separate the two salts from each other which comprises adding ammonium chloride to said solution in the approximate proportion of one molecular weight of ammonium chloride to one molecular weight of magnesium chloride in the solution, cooling said solution to approximately 30 degrees C. to form crystals of magnesium ammonium chloride hexahydrate therein, and thereafter separating the crystals from the solution.

5. The process of treating a solution containing magnesium chloride and calcium chloride to separate the two salts from each other which comprises adding ammonium chloride to said solution to form magnesium ammonium chloride, evaporating water from said solution until only approximately sufficient water remains to form the hexahydrates of calcium chloride and magnesium ammonium chloride, cooling said solution to approximately 30 degrees C. to form crystals of magnesium ammonium chloride hexahydrate therein, and thereafter separating the crystals from the solution.

6. The process of treating a solution containing magnesium chloride and calcium chloride to separate the two salts from each other which comprises adding ammonium chloride to the solution in the approximate proportion of one molecular weight of ammonium chloride to one molecular weight of magnesium chloride in the solution to form magnesium ammonium chloride therein, evaporating water from said solution until only approximately sufficient water remains to form the hexahydrates of the calcium chloride and magnesium ammonium chloride, cooling said solution to approximately 30 degrees C. to form crystals of magnesium ammonium chloride hexahydrate therein, and thereafter separating the crystals from the solution.

7. The process of treating a solution containing magnesium chloride and calcium chloride to separate the two salts from each other, which comprises adding ammonium chloride to said solution to form magnesium ammonium chloride, evaporating said solution until a concentration of approximately 50 degrees Baumé is obtained, cooling said solution to approximately 30 degrees C. to form crystals of magnesium ammonium chloride hexahydrate therein, and thereafter separating the crystals from the solution.

8. The process of treating a solution containing magnesium chloride and calcium chloride to separate the two salts from each other which comprises adding ammonium chloride to the solution in the approximate proportion of one molecular weight of ammonium chloride to one molecular weight of magnesium chloride in the solution, evaporating said solution until a concentration of approximately 50 degrees Baumé is obtained, cooling said solution to approximately 30 degrees C. to form crystals of magnesium ammonium chloride hexahydrate therein, and thereafter separating the crystals from the solution.

9. The process of treating a concentrated solution containing more than 1 part by weight of magnesium chloride to 3 parts by weight of calcium chloride to separate the two salts from each other which comprises adding ammonium chloride to the solution to form magnesium ammonium chloride therein, cooling said solution to approximately 30 degrees C., removing the crystals of magnesium ammonium chloride hexahydrate obtained from the solution, evaporating water from said solution until only approximately sufficient water remains to form the hexahydrates of the calcium chloride and magnesium ammonium chloride, cooling said solution to approximately 30 degrees C. to form crystals of magnesium ammonium chloride hexahydrate therein, and thereafter separating the crystals from the solution.

10. The process of treating a concentrated solution containing more than 1 part by weight of magnesium chloride to 3 parts by weight of calcium chloride to separate the two salts from each other which comprises adding ammonium chloride to the solution in the approximate proportion of one molecular weight of ammonium chloride to one molecular weight of magnesium chloride in the solution to form magnesium ammonium chloride, cooling said solution to approximately 30 degrees C., removing the crystals of magnesium ammonium chloride hexahydrate obtained from the solution, evaporating water from said solution until only approximately sufficient water remains to form the hexahydrates of the calcium chloride and magnesium ammonium chloride, cooling said solution to approximately 30 degrees C. to form crystals of magnesium ammonium chloride hexahydrate therein, and thereafter separating the crystals from the solution.

TAYLOR A. BORRADAILE.